(12) United States Patent
Kim

(10) Patent No.: US 11,099,932 B2
(45) Date of Patent: Aug. 24, 2021

(54) CONTROLLER AND MEMORY SYSTEM

(71) Applicant: SK hynix Inc., Gyeonggi-do (KR)

(72) Inventor: Do Hun Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/555,264

(22) Filed: Aug. 29, 2019

(65) Prior Publication Data

US 2020/0201711 A1 Jun. 25, 2020

(30) Foreign Application Priority Data

Dec. 24, 2018 (KR) .................. 10-2018-0168761

(51) Int. Cl.
*G06F 11/10* (2006.01)
*G06F 21/60* (2013.01)
*H03M 13/11* (2006.01)

(52) U.S. Cl.
CPC ........ *G06F 11/1076* (2013.01); *G06F 21/602* (2013.01); *H03M 13/1102* (2013.01)

(58) Field of Classification Search
CPC ............... G06F 11/1076; G06F 21/602; G06F 11/1048; H03M 13/1102; H03M 13/2906; H03M 13/09; H03M 13/63; G11C 29/42
See application file for complete search history.

(56) References Cited

U.S. PATENT DOCUMENTS

2017/0288812 A1\* 10/2017 Myung ................ H03M 13/116

FOREIGN PATENT DOCUMENTS

KR 10-2012-0063329 6/2012
KR 10-2016-0091080 8/2016

\* cited by examiner

*Primary Examiner* — Thien Nguyen
(74) *Attorney, Agent, or Firm* — IP & T Group LLP

(57) ABSTRACT

A controller includes an Error Correction Code (ECC) encoder adding a first parity to data to generate a data set, and encoding the data set to generate a first parity data set, a buffer temporarily storing the first parity data set, an ECC decoder decoding the first parity data set received from the buffer to generate a decoded data set, a first checker performing a Low Density Parity Check (LDPC) encoding on the decoded data set to generate an LDPC data set to which a second parity is added, and a second checker performing a syndrome check operation on the LDCP data set including the first and second parities.

7 Claims, 6 Drawing Sheets

CONTROLLER AND MEMORY SYSTEM

CROSS-REFERENCE TO RELATED APPLICATION

The present application claims priority under 35 U.S.C. § 119(a) to Korean patent application number 10-2018-0168761, filed on Dec. 24, 2018, which is incorporated herein by reference in its entirety.

BACKGROUND

Field of Invention

Various embodiments of the present disclosure generally relate to a controller and a memory system including the controller, and more particularly, to a data path protection technology of the controller.

Description of Related Art

A memory system includes a memory device for storing data and a controller for communicating between the memory device and a host.

The memory devices are generally classified into either volatile memory devices or non-volatile memory devices. Volatile memory devices may lose data stored therein when the power supply is blocked, and non-volatile memory devices may retain the stored data even in the absence of a power supply.

Recently, non-volatile memory devices have increasingly used as the use of portable electronic devices increases.

A controller may control operations of a non-volatile memory device, and transfer data between a host and the non-volatile memory device. A Data Path Protection (DPP) operation may be performed to increase the reliability of data to be transferred.

For example, an encryption operation, an encoding operation, a decoding operation, and/or an error check operation may be performed during the DPP operation. There is a demand to increase the reliability of each operation performed during the DPP operation while reducing an overall operation time.

SUMMARY

Various embodiments are directed to a controller capable of increasing the reliability of data with decreasing the time required for transferring the data during a write operation, and to a memory system including the controller.

According to an embodiment, a controller may include an Error Correction Code (ECC) encoder adding a first parity to data to generate a data set, and encoding the data set to generate a first parity data set; a buffer temporarily storing the first parity data set; an ECC decoder decoding the first parity data set received from the buffer to generate a decoded data set; a first checker performing a Low Density Parity Check (LDPC) encoding on the decoded data set to generate an LDPC data set to which a second parity is added; and a second checker performing a syndrome check operation on the LDCP data set including the first and second parities.

According to an embodiment, a controller may include a host controller encrypting a first data which is received from a host, add a parity to the encrypted data, and encoding the encrypted data; a first buffer temporarily storing the encrypted data which is output from the host controller; and a memory controller adding an additional parity to the encrypted data, which is output from the first buffer, to perform an error check operation, wherein the memory controller outputs the error-checked data as a second data when no error is found.

According to an embodiment, a memory system may include a controller, during a write operation, adding first and second parities to original data which is received from a host, adding an LDPC parity to a first data set which includes the first and second parities, performing an LDPC encoding, and performing a syndrome check operation on a second data set, which includes the first, second, and LDPC parities; and a memory device storing the second data set, which is output from the controller, wherein, during a read operation, the controller receives the second data set from the memory device, performs an error correction operation on the second data set, and then outputs the original data to the host.

According to an embodiment, a data path protection method of a controller, the method includes encoding original data received from a host to generate encrypted data in which first and second parities are added; temporarily storing the encrypted data in a buffer; performing an LDPC encoding on the encrypted data received from the buffer to add an LDPC parity to generate a LDPC parity-added data; performing a syndrome check operation on the LDPC parity-added data including the first, second, and LDPC parities; and storing the LDPC parity-added data in a memory device.

DETAILED DESCRIPTION

Advantages and features of the present invention and methods for achieving them will be made clear from embodiments described below in detail with reference to the accompanying drawings. However, they may be embodied in different forms and should not be construed as limited to the embodiments set forth herein. Rather, these embodiments are provided so that this disclosure will be thorough and complete, and will fully convey the scope of the example embodiments to those skilled in the art.

It will be understood that when an element is referred to as being "coupled" or "connected" to a certain element, it may be "directly coupled or connected" to the certain element or may be "indirectly coupled or connected" to the certain element, with intervening elements being present therebetween.

It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

Figure 1:
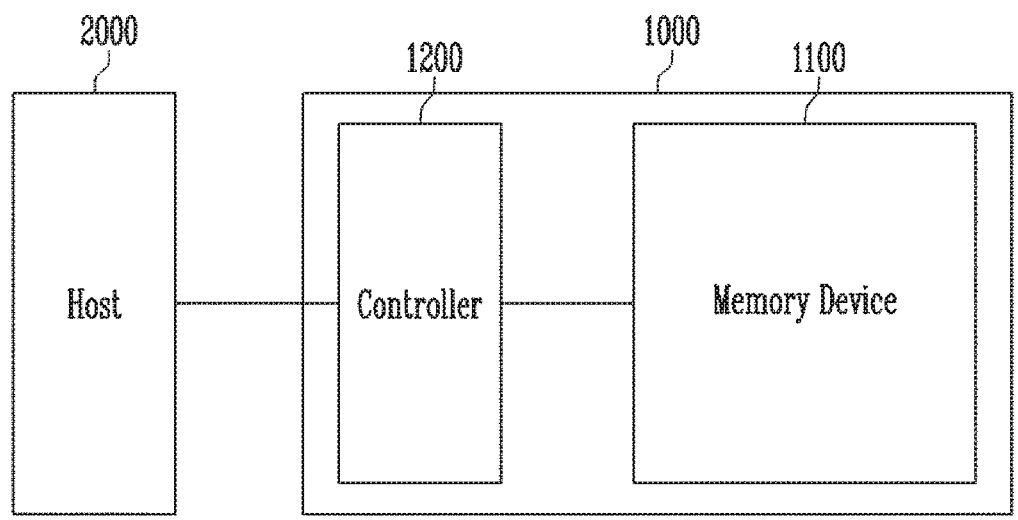
FIG. 1 is a block diagram illustrating a memory system according to an embodiment of the present disclosure.

FIG. 1 is a block diagram illustrating a memory system 1000 according to an embodiment of the present disclosure.

Referring to FIG. 1, the memory system 1000 may include a memory device 1100 and a controller 1200.

The memory device 1100 may include a single storage device or a plurality of storage devices. Each storage device may include a plurality of memory cells storing data therein. The memory device 1100 may perform a write operation, a read operation, and an erase operation of data under the control of the controller 1200. The memory device 1100 may include at least one non-volatile memory device, e.g., NAND flash memory.

The controller 1200 may control the memory device 1100 in response to a request of a host 2000, and control the memory device 1100 through an internal operation without a request from the host 2000. For example, when the controller 1200 receives a write request and data from the host 2000, the controller 1200 may transfer the received data to the memory device 1100. The controller 1200 may not directly transfer the data received from the host 2000 to the memory device 1100, but may transfer the data to the memory device 1100 after performing an error check operation to increase the reliability of data. An error check operation performed in the controller 1200 will be described below.

The host 2000 may communicate with the memory device 1100 through the controller 1200 by using an interface protocol such as Peripheral Component Interconnect-Express (PCI-E), Advanced Technology Attachment (ATA), Serial ATA (SATA), Parallel ATA (PATA), or Serial Attached SCSI (SAS). The interface protocol used between the host 2000 and the memory system 1000 may not be limited to the above examples, and may include a Universal Serial Bus (USB), a Multi-Media Card (MMC), an Enhanced Small Disk Interface (ESDI), or Integrated Drive Electronics (IDE).

Figure 2:
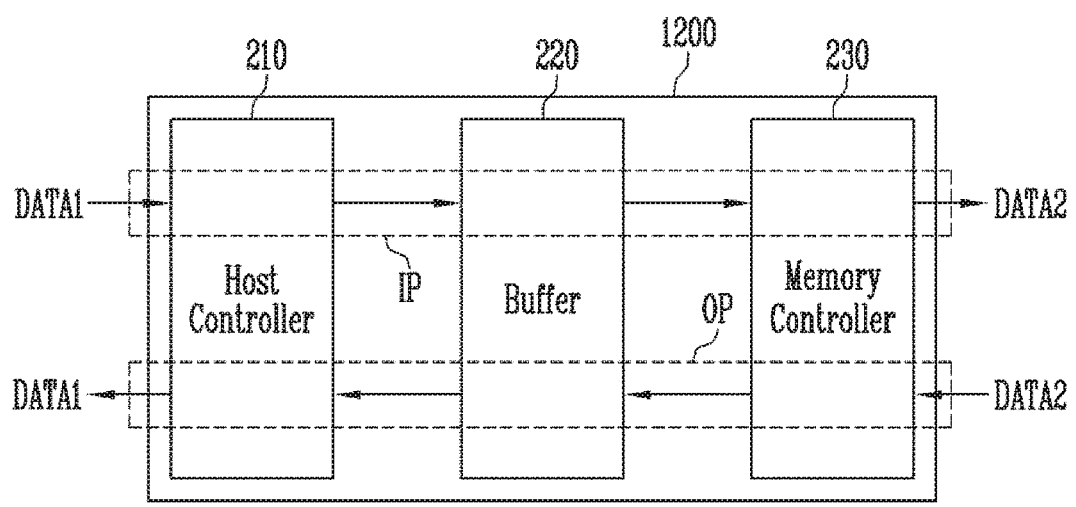
FIG. 2 is a detailed diagram of a controller included in the memory system shown in FIG. 1.

FIG. 2 is a detailed diagram of the controller 1200 included in the memory system 1000 shown in FIG. 1.

Referring to FIG. 2, the controller 1200 may transfer data received from the host 2000 shown in FIG. 1 to the memory device 1100 shown in FIG. 1, and transfer data read from the memory device 1100 to the host 2000. The controller 1200 includes a host controller 210, a buffer 220, and a memory controller 230. The host controller 210 may be referred to as host interface (I/F), and the memory controller 230 may be referred to as memory interface (I/F).

Hereinafter, data which is transferred from the host 2000 to the controller 1200 may be referred to as "first data DATA1", and data which is transferred from the controller 1200 to the memory device 1100 may be referred to as "second data DATA2". In other words, the first data DATA1 may be original data, and the second data DATA2 may be data converted from the first data DATA1.

The host controller 210, the buffer 220, and the memory controller 230 may convert the first data DATA1 into the second data DATA2, and transfer the second data DATA2 to the memory device 1100, along an input path IP. The host controller 210, the buffer 220, and the memory controller 230 may restore the second data DATA2 to the first data DATA1, and output the first data DATA1 to the host 2000, along an output path OP. In other words, the host controller 210, the buffer 220, and the memory controller 230 may include devices used in each of the input path IP and the output path OP, use the devices included in the input path IP during a write operation, and use the devices included in the output path OP during a read operation.

The host controller 210 may perform an encryption operation and a parity addition operation on the first data DATA1 during the write operation. During the read operation, the host controller 210 may perform a parity removal operation, restore the encrypted data to the first data DATA1, and transfer the first data DATA1 to the host 2000.

The buffer 220 may temporarily store the data transferred from the host controller 210 or the memory controller 230 during the write operation and the read operation.

The memory controller 230 may perform an error check operation on the data received from the buffer 220, and transfer the second data DATA2 on which the error check operation is performed to the memory device 1100, during the write operation. The memory controller 230 may perform an error check operation on the second data DATA2 received from the memory device 1100, and transfer the error-checked data to the buffer 220, during the read operation.

In other words, the devices included in the input path IP may be used to check whether there is communication failure of data which is transferred to the memory device 1100 through the controller 1200 during the write operation. Further, the devices included in the output path OP may be used to check whether there is communication failure of data which is output to the host 2000 through the controller 1200 during the read operation.

The host controller 210, the buffer 220, and the memory controller 230 as recited above will be described below in more detail.

Figure 3:
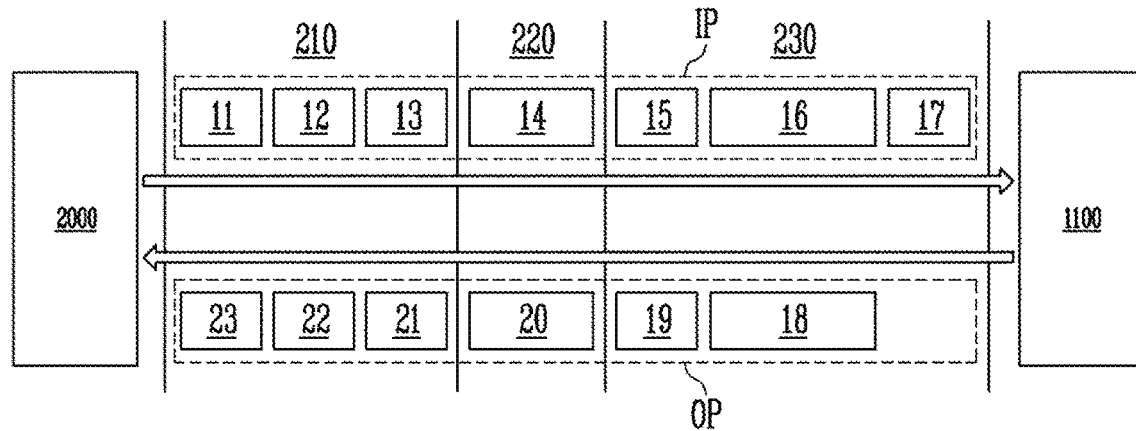
FIG. 3 is a detailed diagram of a data transfer path of the controller shown in FIG. 2.

FIG. 3 is a detailed diagram of a data transfer path of the controller shown in FIG. 2.

Referring to FIG. 3, the input path IP may include an external Cyclic Redundancy Check (CRC) encoder 11, an encryption encoder 12, a first Error Correction Code (ECC) encoder 13, a first buffer 14, a first Error Correction Code (ECC) decoder 15, a first checker 16, and a second checker 17. The output path OP may include a third checker 18, a second ECC encoder 19, a second buffer 20, a second ECC decoder 21, a decryption decoder 22, and an external Cyclic Redundancy Check (CRC) decoder 23.

The external CRC (ECRC) encoder 11, the encryption encoder 12, the first ECC encoder 13, the second ECC decoder 21, the decryption decoder 22, and the external CRC (ECRC) decoder 23 may be included in the host controller 210. The first and second buffers 14 and 20 may be included in the buffer 220. The first ECC decoder 15, the first checker 16, the second checker 17, the third checker 18, and the second ECC encoder 19 may be included in the memory controller 230.

Accordingly, the external CRC encoder 11, the encryption encoder 12, and the first ECC encoder 13 included in the input path IP of the host controller 210, the first buffer 14 included in the input path IP of the buffer 220, the first ECC decoder 15, the first checker 16, and the second checker 17 included in the input path IP of the memory controller 230 may operate during the write operation. The third checker 18 and the second ECC encoder 19 included in the output path OP of the memory controller 230, the second buffer 20 included in the output path OP of the buffer 220, the second ECC decoder 21, the decryption decoder 22, and the external CRC decoder 23 included in the output path OP of the host controller 210 may operate during the read operation.

Each of the devices included in the host controller 210, the buffer 220, and the memory controller 230 as recited above will be described below in more detail.

Figure 4:
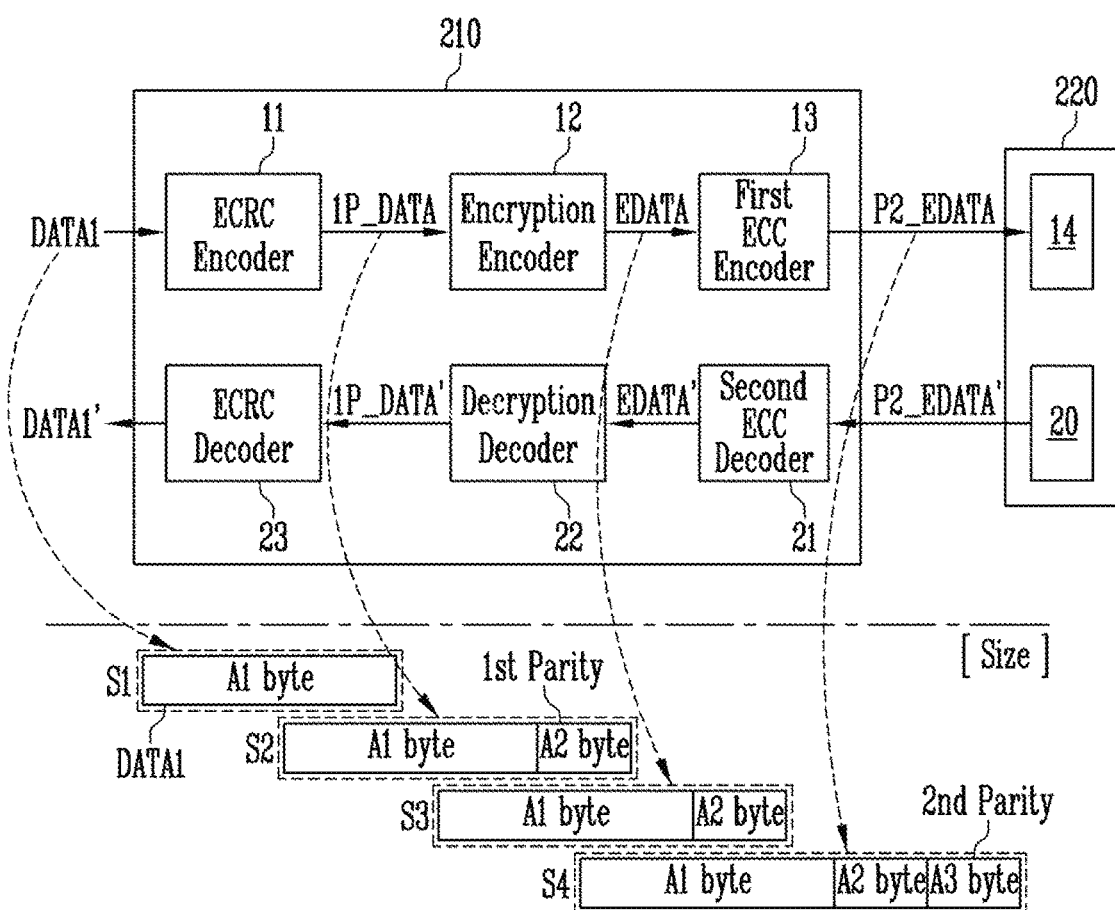
FIG. 4 is a diagram for describing a data transfer method in a host controller included in the controller shown in FIG. 3.
Figure 5:
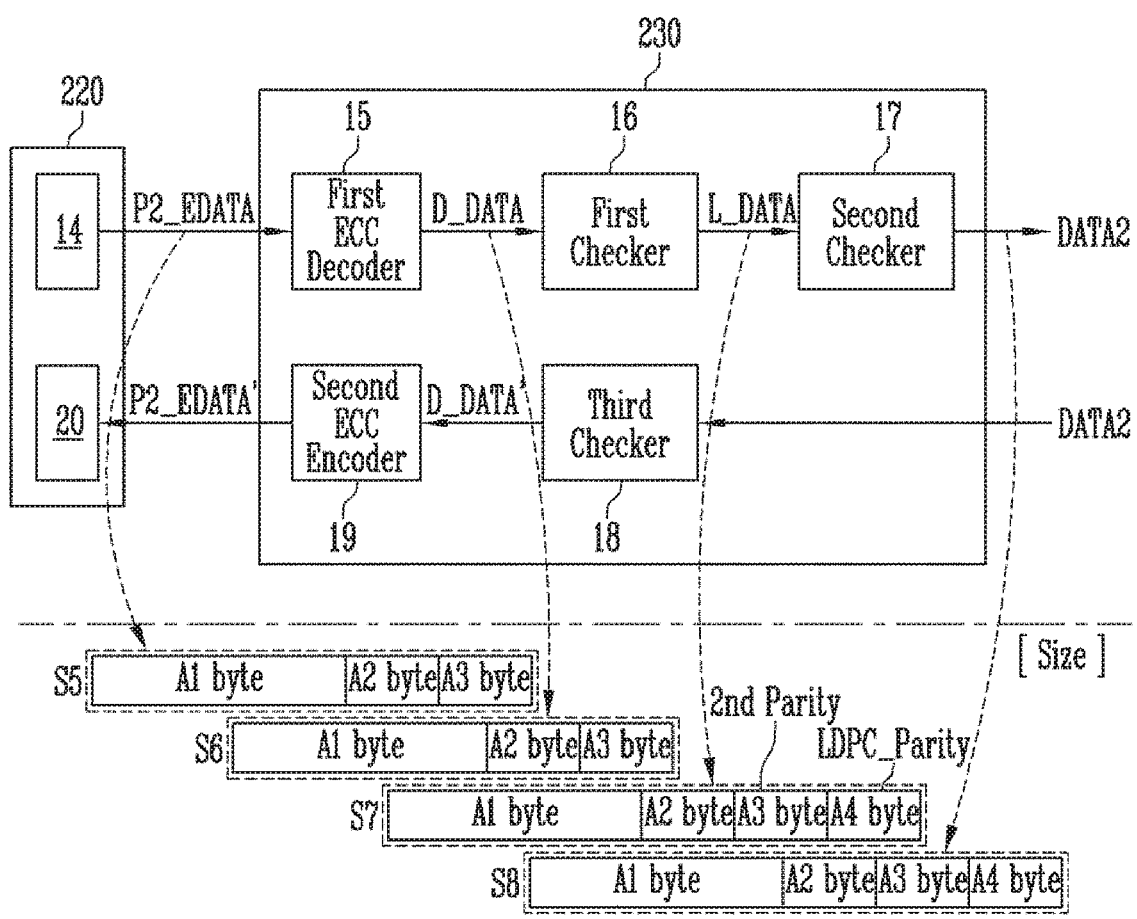
FIG. 5 is a diagram for describing a data transfer method in a memory controller included in the controller shown in FIG. 3.
Figure 6:
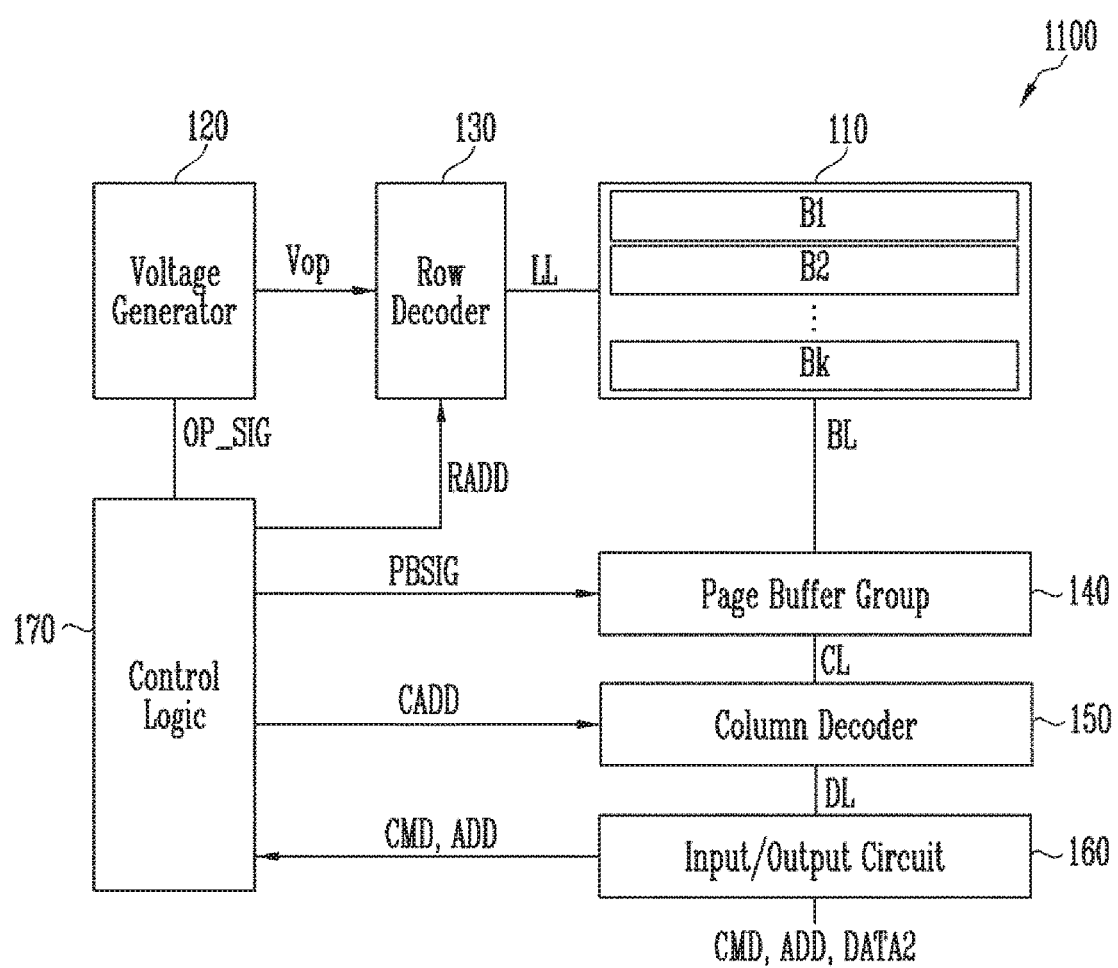
FIG. 6 is a detailed diagram of a memory device included in the memory system shown in FIG. 1.

FIG. 4 is a diagram for describing a data transfer method in the host controller 210 included in the controller 1200 shown in FIG. 3. FIG. 5 is a diagram for describing a data transfer method in the memory controller 230 included in the controller 1200 shown in FIG. 3. FIG. 6 is a detailed diagram of the memory device 1100 included in the memory system 1000 shown in FIG. 1.

Each of the write operation and the read operation will be described with reference to FIGS. 4, 5, and 6 as below.

Write Operation

Referring to FIG. 4, the write operation may refer to an operation of converting the first data DATA1 received from the host 2000 into the second data DATA2 and transferring the second data DATA2 to the memory device 1100 when a write request is provided from the host 2000. This write operation may be performed in the controller 1200.

During the write operation, when receiving the first data DATA1 from the host 2000, the ECRC encoder 11 may output a first parity data set 1P_DATA, that is, the first data DATA1 to which a first parity 1st Parity is added. The first parity 1st Parity may be added to the first data DATA1 to encrypt the first data DATA1. For example, it may be assumed that a size "S1" of the first data DATA1 is "A1 byte", and a size "S2" of the first parity data set 1P_DATA including the first parity 1st Parity of A2 byte is "A1+A2 byte". For example, a size of parity may be about 10% of a size of data.

The encryption encoder 12 may encrypt the first parity data set 1P_DATA to output an encrypted data set EDATA. The encryption encoder 12 may encrypt the first parity data set 1P_DATA by using a Data Encryption Standard (DES) algorithm or an Advanced Encryption Standard (AES) algorithm. The AES algorithm has the improved encryption performance compared to the DES algorithm. Even when the first parity data set 1P_DATA is encrypted, the number of entire bits may not be changed. Accordingly, a size S3 of the encrypted data set EDATA may be the same as the size S2 of the first parity data set 1P_DATA. In some cases, the size S3 of the encrypted data set EDATA may be different from the size S2 of the first parity data set 1P_DATA. Since the first data DATA1 and the first parity 1st Parity included in the first parity data set 1P_DATA are encrypted by the encryption encoder 12, the first data DATA1 and the first parity 1st Parity may not be distinguished from each other in the encrypted data set EDATA.

The first ECC encoder 13 may add a second parity 2nd Parity to the encrypted data set EDATA, encode the encrypted data set EDATA and the second parity 2nd Parity to output a second parity data set P2_EDATA. The second parity 2nd Parity may have a size of A3 byte. Accordingly, the size of the second parity 2nd Parity may be added to the size S3 of the encrypted data set EDATA, so that a size S4 of the second parity data set P2_EDATA may be A1+A2+A3 byte.

The second parity data set P2_EDATA may be temporarily stored in the first buffer 14 before performing Low Density Parity Check (LDPC) encoding.

The first buffer 14 may temporarily store the second parity data set P2_EDATA until the write operation is completed. The first buffer 14 may be provided as a volatile memory or a non-volatile memory. For example, the first buffer 14 may be embodied as Dynamic Random Access Memory (DRAM), Static Random Access Memory (SRAM), or a non-volatile memory.

Referring to FIG. 5, the first ECC decoder 15 may decode the second parity data set P2_EDATA which is temporarily stored in the first buffer 14 to output a decoded data set D_DATA. A size S5 of the second parity data set P2_EDATA input to the first ECC decoder 15 may be the same as the size S4 of the second parity data set P2_EDATA input to the first buffer 14.

The decoded data set D_DATA may be the same as the encrypted data set EDATA input to the first ECC encoder 13. For example, since the second parity data set P2_EDATA which is encoded in the first ECC encoder 13, is decoded by the first ECC decoder 15, a value of the decoded data set D_DATA output from the first ECC decoder 15 may be the same as a value of the encrypted data set EDATA before being encoded by the first ECC encoder 13. Accordingly, a size S6 of the decoded data set D_DATA may be the same as the size S5 of the second parity data set P2_EDATA.

The first checker 16 may encode the decoded data set D_DATA by Low Density Parity Check (LDPC) encoding to output an LDPC data set L_DATA. For example, the first checker 16 may perform an LDPC encoding operation by multiplying the decoded data set D_DATA by a generation matrix, and output the LDPC data set L_DATA generated by a result of the operation.

$$[D_{DATA}<1> \ldots D_{DATA}<N>] \cdot \begin{bmatrix} A_{11} & \cdots & A_{1N} \\ \vdots & \ddots & \vdots \\ A_{K1} & \cdots & A_{KN} \end{bmatrix} = [L\_DATA<1> \cdots L\_DATA<K>] \quad \text{[Equation 1]}$$

Referring to 'Equation 1', the generation matrix may include rows of 'K' bits (or bytes) and columns of 'N' bits (or bytes), and may be differently designed according to LDPC performance. In other words, a single row may include 'N' bits (or bytes). Here, both 'K' and 'N' are positive integers and 'N' is greater than 'K'. 'K' may be the same as the size S6 of the decoded data set D_DATA.

Accordingly, a size S7 of the LDPC data set L_DATA generated by the LDPC encoding operation may be 'N' bits (or bytes), and an LDPC parity LDPC_Parity may be added as much as difference between 'K' and 'N'. In other words, the LDPC parity LDPC_Parity of (N−K) bits (or bytes) may be added to the size S6 of the decoded data set D_DATA to result in the size S7 of the LDPC data set L_DATA. For example, when 'K' is A1+A2+A3 bytes and 'N' is A1+A2+

A3+A4 bytes, the LDPC parity LDPC Parity added to the LDPC data set L_DATA may be A4 bytes. The size of the LDPC parity LDPC_Parity may change according to a generation matrix set in the first checker 16. The LDPC data set L_DATA may be a code word generated by a result of LDPC encoding. A2, A3, and A4 may be the same as or different from each other.

The second checker 17 may perform a syndrome check operation on the LDPC data set L_DATA. For example, the second checker 17 may calculate a syndrome vector (S<(N−K):1>) of (N−K) bits (or bytes) by multiplying a parity check matrix by the LDPC data set L_DATA. The second checker 17 may determine whether a syndrome check operation passes or fails according to the syndrome vector (S<(N−K):1>).

$$\begin{bmatrix} B_{11} & \cdots & B_{1N} \\ \vdots & \ddots & \vdots \\ B_{(N-K)1} & \cdots & B_{(N-K)N} \end{bmatrix} \cdot \begin{bmatrix} L\_DATA<1> \\ \vdots \\ L\_DATA<N> \end{bmatrix} = \begin{bmatrix} S<1> \\ \vdots \\ S<N-K> \end{bmatrix} \quad \text{[Equation 2]}$$

Referring to 'Equation 2', a parity check matrix may include rows of (N−K) bits (or bytes) and columns of N bits (or bytes). In other words, a single row may include N bits (or bytes). The size S7 of the syndrome vector (S<(N−K):1>) calculated by multiplying the parity check matrix by the LDPC data set L_DATA may be (N−K) bits (or bytes). When all bits included in the syndrome vector (S<(N−K):1>) are '0', the syndrome check operation passes. When '1' is included in the bits included in the syndrome vector (S<(N−K):1>), the syndrome check operation fails.

The second checker 17 may perform the syndrome check operation of the LDPC data set L_DATA by changing check nodes until all bits included in the syndrome vector (S<(N−K):1>) become '0'. In other words, the second checker 17 may perform the syndrome check operation on a modified data set which includes the first data DATA1, the first parity 1st Parity, the second parity 2nd Parity, and the LDPC parity LDPC_Parity.

When the syndrome check operation passes, the second checker 17 may output the second data DATA2. The second data DATA2 may be the LDPC data set L_DATA on which the syndrome check operation passes. The second data DATA2 output from the second checker 17 may be transferred to the memory device 1100, and the memory device 1100 may program the received second data DATA2 into a selected memory region.

When the syndrome check operation fails, the second checker 17 may search for a check node value to make all bits included in the syndrome vector (S<(N−K):1>) become '0'.

An embodiment of the memory device 1100 will be described in detail with reference to FIG. 6 as below.

Referring to FIG. 6, the memory device 1100 may include a memory cell array 110 for storing data, peripheral circuits for performing program, read or erase operations, and a control logic 170 for controlling the peripheral circuits based on a command CMD and an address ADD. For example, the peripheral circuits may include a voltage generator 120, a row decoder 130, a page buffer group 140, a column decoder 150, and an input/output circuit 160.

The memory cell array 110 may include a plurality of memory blocks B1 to Bk, where k is a positive integer. The memory blocks B1 to Bk may include a plurality of memory cells and have a two-dimensional or three-dimensional structure. For example, in two-dimensionally structured memory blocks B1 to Bk, memory cells may be arranged in a horizontal direction to a substrate. In three-dimensionally structured memory blocks B1 to Bk, memory cells may be stacked in a vertical direction to a substrate.

The voltage generator 120 may generate and output operating voltages Vop necessary for respective operations in response to operating signals OP_SIG. For example, when the operating signals OP_SIG for the program operation are provided, the voltage generator 120 may generate a program voltage, a pass voltage, a program verify voltage, and the like. When the operating signals OP_SIG for the read operation are provided, the voltage generator 120 may generate a read voltage, a pass voltage, and the like. When the operating signals OP_SIG for the erase operation are provided, the voltage generator 120 may generate an erase voltage, a pass voltage, an erase verify voltage, and the like.

The row decoder 130 may transfer the operating voltages Vop to a selected memory block through local lines LL according to a row address RADD.

The page buffer group 140 may be coupled to the memory blocks B1 to Bk through bit lines BL, and include page buffers coupled to the bit lines BL, respectively. The page buffer group 140 may control a voltage of the bit lines BL or sense a voltage or a current of the bit lines BL in response to page buffer control signals PBSIG.

The column decoder 150 may exchange data with the page buffer group 140, or may exchange data with the input/output circuit 160 in response to a column address CADD. For example, the column decoder 150 may exchange data with the page buffer group 140 through column lines CL, and exchange data with the input/output circuit 160 through data lines DL.

The input/output circuit 160 may receive the command CMD, an address ADD, and the second data DATA2 from the controller 1200 during the write operation, and output the second data DATA2 to the controller 1200 during the read operation. For example, the input/output circuit 160 may transfer the received command CMD and address ADD to the control logic 170, and transfer the second data DATA2 to the column decoder 150. In addition, the input/output circuit 160 may output the second data DATA2 read from the memory blocks B1 to Bk to the controller 1200.

The control logic 170 may output control signals for controlling the peripheral circuits based on the command CMD and the address ADD. The control signals may include the operating signals OP_SIG and the page buffer control signals PBSIG. In addition, the control logic 170 may output the row address RADD and the column address CADD in response to the address ADD.

As described above, the data check operation is performed on the data set, that is, the first data DATA1, which is provided from the host 2000 during the write operation, to which the first and second parities 1st Parity and 2nd Parity and the LDPC parity LDPC_Parity are added. Accordingly, the logic for transferring data may be simplified when compared to the conventional method using more parities than the parities as described above. In addition, the reliability of a data transfer method may be improved without increasing the number of buffers used for transferring data in the controller 1200.

Read Operation

Referring to FIG. 5, the read operation may refer to an operation of converting the second data DATA2 read from the memory device 1100 into the first data DATA1 and outputting the first data DATA1 to the host 2000 when a read request is provided from the host 2000. This read operation may be performed in the controller 1200.

When a second data DATA2' read from the memory device 1100 is received, the third checker 18 may perform an error correction operation on the second data DATA2 with removing the LDPC parity LDPC_Parity included in the second data DATA2 to output a data set D_DATA'.

The second ECC encoder 19 may encode the data set D_DATA' output from the third checker 18 to output an encoded data set P2_EDATA'. The encoded data set P2_EDATA' output from the second ECC encoder 19 may be temporarily stored in the second buffer 20 included in the buffer 220.

The second buffer 20 may temporarily store the encoded data set P2_EDATA' until the read operation is completed. The second buffer 20 may be provided as a volatile memory or a non-volatile memory. For example, the second buffer 20 may be embodied as Dynamic Random Access Memory (DRAM), Static Random Access Memory (SRAM), or flash memory.

Referring back to FIG. 4, the second ECC decoder 21 may decode the encoded data set P2_EDATA' stored in the second buffer 20 to output a decoded data set EDATA. The decoded data set EDATA' output from the second ECC decoder 21 may be the same data as the encrypted data set EDATA output from the encryption encoder 12. The second ECC decoder 21 may remove the second parity 2nd Parity from the encoded data set P2_EDATA' while decoding, and output the decoded data set EDATA'.

The decryption decoder 22 may decrypt the decoded data set EDATA' to output a decrypted data set 1P_DATA' which is decrypted.

The ECRC decoder 23 may decode the decoded data set 1P_DATA' with removing the first parity 1st Parity from the decoded data set 1P_DATA' to output a first data DATA1'. In other words, the first data DATA1' output from the ECRC decoder 23 may be output to the host 2000.

Figure 7:
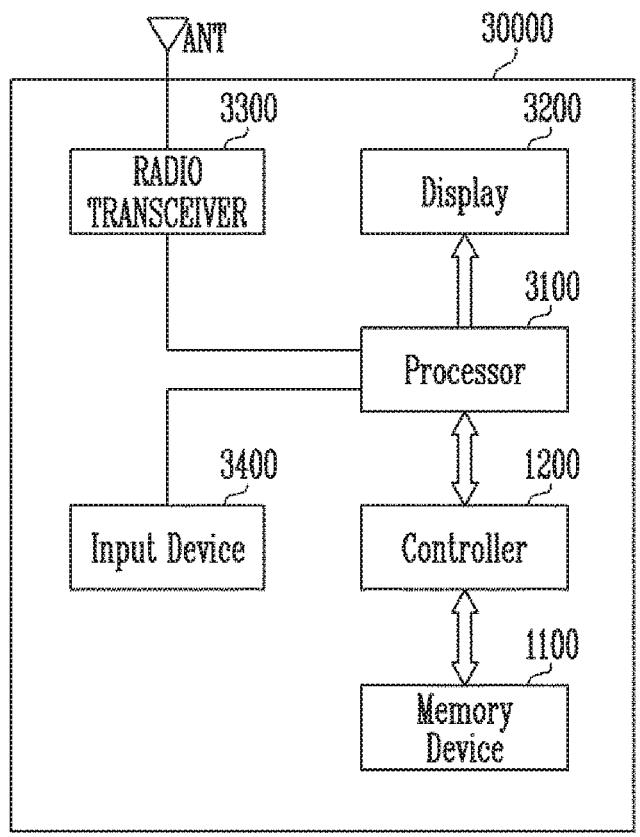
FIGS. 7 to 10 are block diagrams illustrating a memory system including a memory device and a controller, according to various embodiments of the present disclosure.

FIG. 7 is a diagram illustrating a memory system 30000 including a memory device and a controller according to an embodiment of the present disclosure.

Referring to FIG. 7, the memory system 30000 may be embodied into a cellular phone, a smartphone, a tablet PC, a personal digital assistant (PDA), or a wireless communication device. The memory system 30000 may include the memory device 1100 and the controller 1200 controlling the operations of the memory device 1100. The controller 1200 may control a data access operation, for example, a program operation, an erase operation, or a read operation of the memory device 1100 in response to control of a processor 3100.

The controller 1200 may control data programmed into the memory device 1100 to be output through a display 3200.

A radio transceiver 3300 may exchange a radio signal through an antenna ANT. For example, the radio transceiver 3300 may change the radio signal received through the antenna ANT into a signal which can be processed by the processor 3100. Accordingly, the processor 3100 may process the signal output from the radio transceiver 3300 and transfer the processed signal to the controller 1200 or the display 3200. The controller 1200 may transfer the signal processed by the processor 3100 to the memory device 1100. In addition, the radio transceiver 3300 may change a signal output from the processor 3100 into a radio signal and output the radio signal to an external device through the antenna ANT. A control signal for controlling the operations of the processor 3100 or data to be processed by the processor 3100 may be input by an input device 3400, and the input device 3400 may be embodied into a pointing device, such as a touch pad and a computer mouse, a keypad, or a keyboard. The processor 3100 may control operations of the display 3200 so that the data output from the controller 1200, the data output from the radio transceiver 3300, or the data output from the input device 3400 are displayed on the display 3200.

According to an embodiment, the controller 1200 for controlling the operations of the memory device 1100 may be formed as a part of the processor 3100, or a separate chip from the processor 3100.

Figure 8:
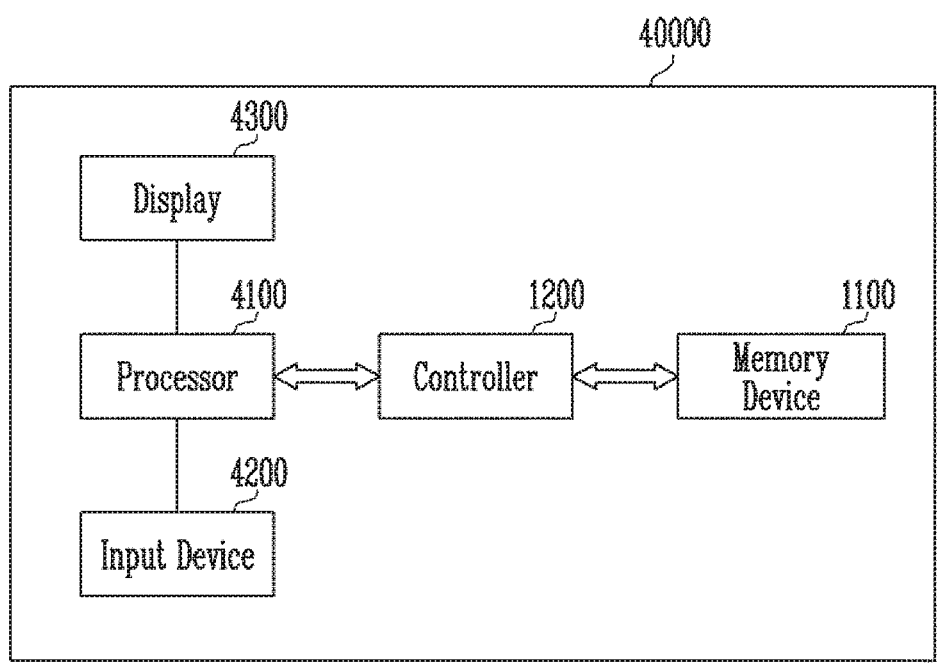

FIG. 8 is a diagram illustrating a memory system 40000 including a memory device and a controller according to an embodiment of the present disclosure.

Referring to FIG. 8, the memory system 40000 may be embodied into a personal computer (PC), a tablet PC, a net-book, an e-reader, a personal digital assistant (PDA), a portable multimedia player (PMP), an MP3 player, or an MP4 player.

The memory system 40000 may include the memory device 1100 storing data and the controller 1200 controlling a data processing operation of the memory device 1100.

A processor 4100 may output data stored in the memory device 1100 through a display 4300 according to data input through an input device 4200. Examples of the input device 4200 may include a pointing device such as a touch pad or a computer mouse, a keypad, or a keyboard.

The processor 4100 may control the general operations of the memory system 40000 and control the operations of the controller 1200. According to an embodiment, the controller 1200 for controlling the operations of the memory device 1100 may be formed as a part of the processor 4100, or a separate chip from the processor 4100.

Figure 9:
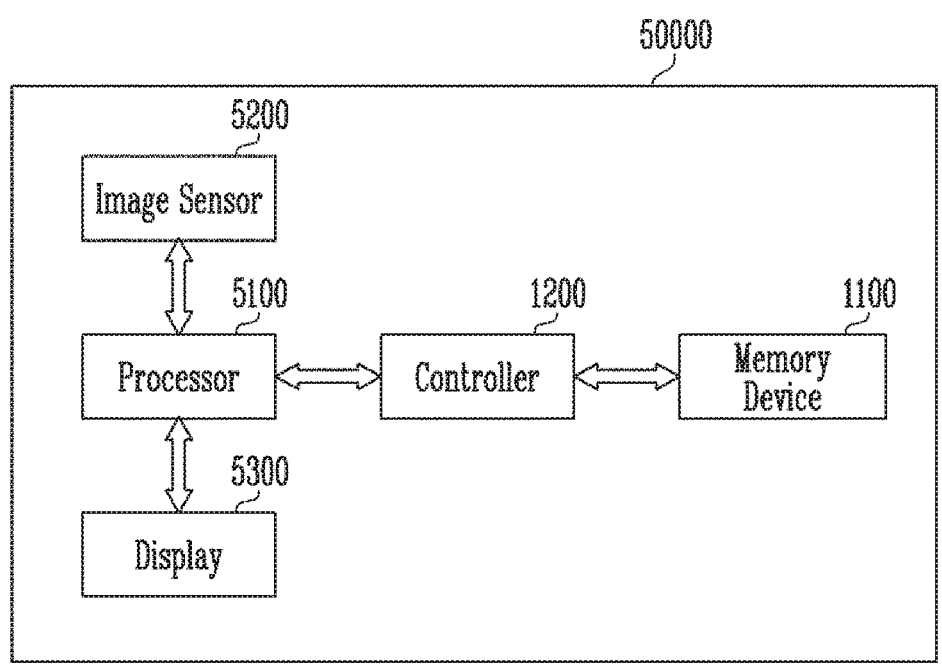

FIG. 9 is a diagram illustrating a memory system 50000 including a memory device and a controller according to an embodiment of the present disclosure.

Referring to FIG. 9, the memory system 50000 may be embodied into an image processor, for example, a digital camera, a smartphone with a digital camera attached thereto, or a tablet PC with a digital camera attached thereto.

The memory system 50000 may include the memory device 1100 and the controller 1200 controlling a data processing operation of the memory device 1100, for example, a program operation, an erase operation, or a read operation.

An image sensor 5200 of the memory system 50000 may convert an optical image into digital signals, and the converted digital signals may be transferred to a processor 5100 or the controller 1200. In response to control of the processor 5100, the digital signals may be output through a display 5300 or stored in the memory device 1100 through the controller 1200. In addition, the data stored in the memory device 1100 may be output through the display 5300 according to control of the processor 5100 or the controller 1200.

According to an embodiment, the controller 1200 for controlling the operations of the memory device 1100 may be formed as a part of the processor 5100, or a separate chip from the processor 5100.

Figure 10:
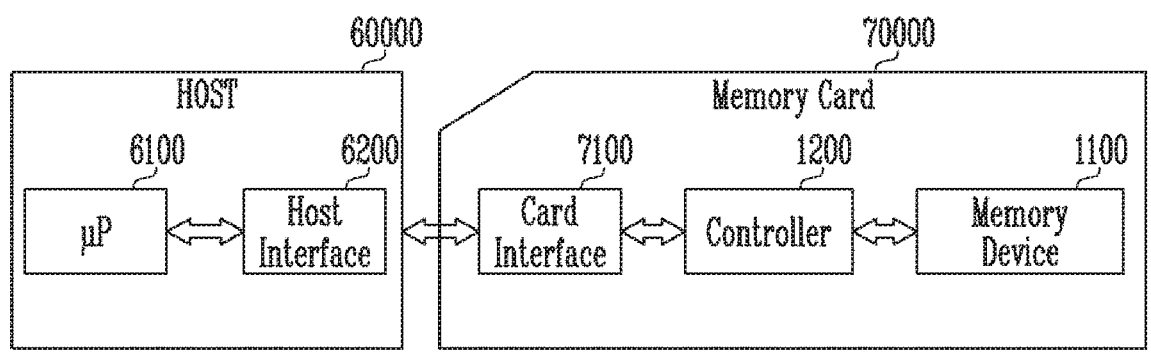

FIG. 10 is a diagram illustrating a memory system 70000 including a memory device and a controller according to an embodiment of the present disclosure.

Referring to FIG. 10, the memory system 70000 may be embodied into a memory card (or a smart card). The memory system 70000 may include the memory device 1100, the controller 1200 and a card interface 7100.

The controller 1200 may control data exchange between the memory device 1100 and the card interface 7100. According to an embodiment, the card interface 7100 may be, but not limited to, a secure digital (SD) card interface or a multi-media card (MMC) interface.

The card interface 7100 may interface data exchange between a host 60000 and the controller 1200 according to a protocol of the host 60000. According to an embodiment, the card interface 7100 may support a Universal Serial Bus (USB) protocol and an InterChip (IC)-USB protocol. The card interface 7100 may refer to hardware that supports a protocol used by the host 60000, software mounted on the hardware, or a signal transmission method.

When the memory system 70000 is connected to an host interface 6200 of the host 60000 such as a PC, a tablet PC, a digital camera, a digital audio player, a cellular phone, console video game hardware, or a digital set-top box, the host interface 6200 may perform data communication with the memory device 1100 through the card interface 7100 and the controller 1200 in response to control of a microprocessor (pP) 6100.

As described above, according to embodiments of the present disclosure, during a write operation of data, logic for transferring data within a controller may be simplified and the reliability of a data transfer operation may be improved without increasing the number of buffers used to transfer data.

Examples of embodiments have been disclosed herein, and although specific terms are employed, various changes in forms and details may be made to the above-described examples of embodiments without departing from the spirit and scope of the present invention. Accordingly, it will be understood by those skilled in the art that the scope of the present invention should not be limited to the above-described examples of embodiments, and may cover the scope of the following claims and their equivalents.

What is claimed is:

1. A controller comprising:
   an external cyclic redundancy check (ECRC) encoder configured to add a first parity to original data which is composed of a first bit number, and generate a first data set including the first parity and the original data, wherein the first data set is composed of a second bit number;
   an encryption encoder configured to encrypt the first data set, and output a second data set which is composed of the second bit number;
   an error correction code (ECC) encoder configured to add a second parity to the second data set by encoding, and generate a third data set which is composed of a third bit number greater than the second bit number;
   a buffer configured to temporarily store the third data set;
   an ECC decoder configured to decode the third data set received from the buffer, and generate a fourth data set which is composed of the third bit number;
   a first checker configured to add a low density parity check (LDPC) parity to the fourth data set by LDPC encoding on the fourth data set, and generate a fifth data set which is composed of a fourth bit number greater than the third bit number; and
   a second checker configured to perform a syndrome check operation on the fifth data set.

2. The controller of claim 1, wherein the buffer includes a volatile memory or a non-volatile memory.

3. The controller of claim 1, wherein the first checker performs the LDPC encoding by multiplying the fourth data set by a generation matrix.

4. The controller of claim 1, wherein the second checker determines whether the syndrome check operation passes or fails according to a result of the syndrome check operation.

5. The controller of claim 4, wherein the second checker performs the syndrome check operation by multiplying a parity check matrix by the fifth data set to calculate a syndrome vector.

6. The controller of claim 5, wherein the second checker determines that the syndrome check operation passes when all bits of the syndrome vector are '0', and that the syndrome check operation fails when at least one bit of '1' is included in the syndrome vector.

7. The controller of claim 6, wherein the second checker:
   when the syndrome check operation passes, transfers the fifth data set to a memory device; and
   when the syndrome check operation fails, searches for a check node value to make all bits of the syndrome vector become '0'.

* * * * *